Nov. 22, 1938.    G. P. SCHWABACHER    2,137,858
CABLE CLAMP
Filed Nov. 21, 1935
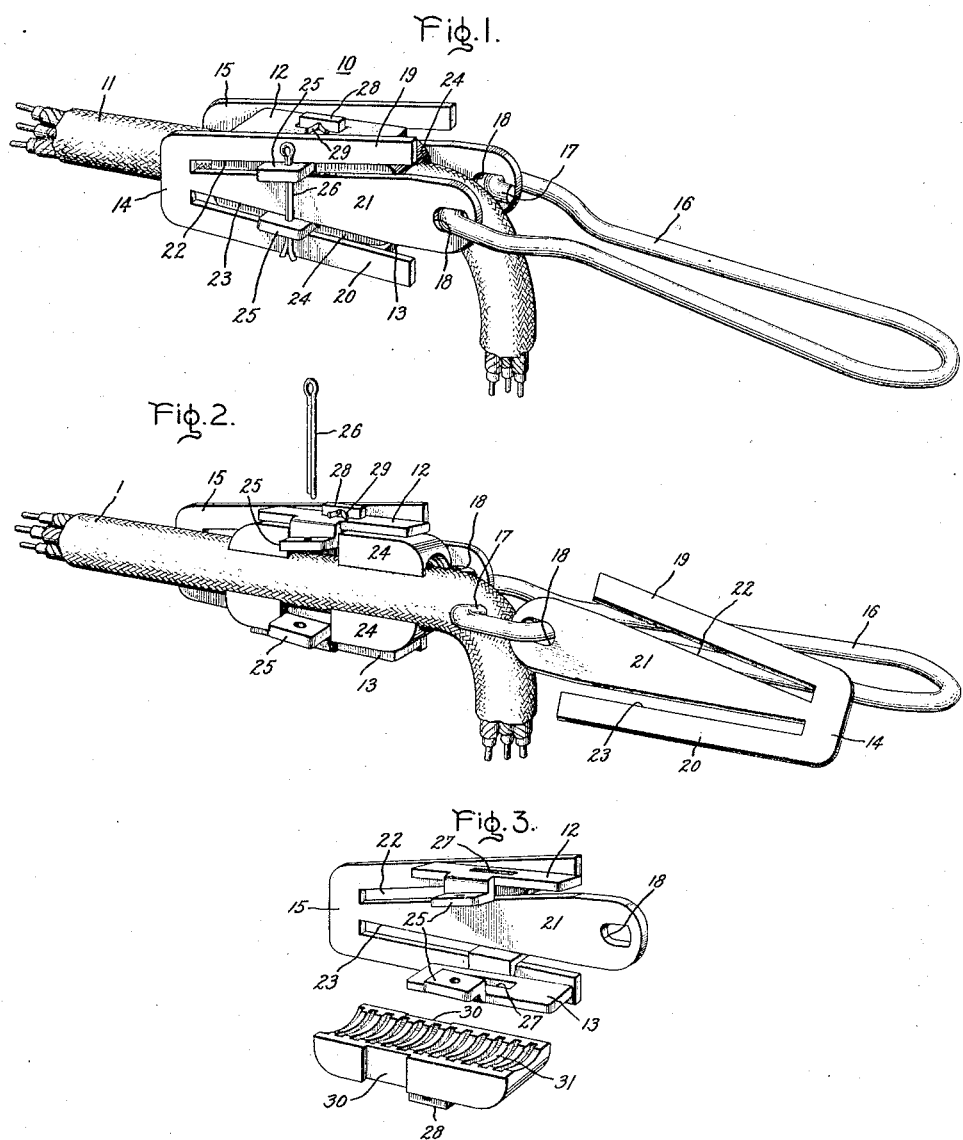
Inventor:
Gerhard P. Schwabacher
by Harry E. Dunham
His Attorney.

Patented Nov. 22, 1938

2,137,858

UNITED STATES PATENT OFFICE 2,137,858

CABLE CLAMP

Gerhard P. Schwabacher, Bridgeport, Conn., assignor to General Electric Company, a corporation of New York Application November 21, 1935, Serial No. 50,926

8 Claims. (Cl. 173—251)

My invention relates to self-tightening cable clamps. More particularly, my invention relates to such clamps especially suitable for clamping an insulated electric cable leading to a house, motor, or other device which consumes electric energy.

An object of my invention is the provision of a cable clamp of the knock-down type, thus facilitating ready-placement upon and ready-removal from a cable of any length without necessitating threading or unthreading the end of the cable through the clamp.

Another object of my invention is the provision of such a cable clamp formed of rugged metal punchings comprising relatively few different parts.

A further object of my invention is the provision of a cable clamp which will positively grip a cable, and automatically tighten its grip upon increasing cable tension, over a relatively wide range of cable diameters.

My invention will be more fully set forth in the following description referring to the accompanying drawing, and the features of novelty which characterize my invention will be pointed out with particularity in the claims appended to and forming a part of this specification.

In the drawing, Fig. 1 is a perspective view of the cable clamp showing the same with the parts thereof in assembled relationship; Fig. 2 is a perspective view of the cable clamp, similar to Fig. 1, with one of the side members thereof swung out of its assembled relationship to more clearly show the structural details of the clamp and to illustrate the simple manner in which the clamp is placed upon or removed from a cable; and Fig. 3 is a perspective view of one of the cable clamping jaws and a perspective view of a partial assembly of the cable clamp showing one of the side members and the top and bottom members in position.

Referring to the drawing, particularly Fig. 1, there is shown my cable clamp designated generally at 10 in assembled relationship about a multiple conductor cable 11 which is being clamped and held under tension. The clamp comprises a body including a top member 12, a bottom member 13 and side members 14 and 15, and a bail 16 secured to the side members 14 and 15. It will be observed that the bail 16 is provided with hooked ends 17 which cooperate with openings 18 in the side members 14 and 15 to firmly secure the bail to the side members. The U-shaped end of the bail is made fast to a suitable anchoring support not shown. The side members 14 and 15 comprise a U-shaped portion, provided with divergent legs 19 and 20, and a central portion 21 provided with divergent edges, lying within the U-shaped portion and joined thereto at the bottom of the U. Converging openings or slots 22 and 23 are formed in the side members 14 and 15 by the disposition of the portions of the side members. These openings serve as guides for bringing the top and bottom members 12 and 13 into clamping position as will be explained hereinafter in greater detail. Although it is preferred that the slots 22 and 23 in the side members 14 and 15 be open-ended as described above and illustrated in the drawing as this construction lends towards easy assembly, they may be closed at either end without departing from the spirit of my invention.

The top and bottom members 12 and 13, shown more clearly in Figs. 2 and 3 are arranged in opposed spaced-apart relation and carry cable clamping jaws 24. These members are provided with offset lugs 25 on either side thereof which are received by the openings 22 and 23 in the side members 14 and 15. The lugs 25 are formed somewhat longer than the thicknesses of the side members 14 and 15 in order that they may protrude beyond these members and receive cotter keys 26 or the like through holes therein to firmly hold the members in assembled relationship. The top and bottom members 12 and 13 are each provided with an opening 27 therein which receives a stud 28 formed integrally with the cable clamping jaw 24. A cotter key 29 or the like is passed through a hole in the stud 28 to lock the jaw firmly in place. The cable clamping jaws 24 are provided with notches 30 in either side thereof which cooperate with offset lugs 25, carried by the top and bottom members 12 and 13, to prevent the jaws from moving relative to the top and bottom members. The clamping jaws 24 may be provided with any desired clamping surface; however, it is preferred that the jaws be serrated and contoured to fit a cable as shown at 31.

The planes of the lugs 25 are disposed at a relatively small angle with respect to the planes of the top and bottom members with which they are integrally formed. This feature is provided in order that the top member 12 and bottom member 13, which are normally parallel to each other may maintain their parallelism as they are brought into clamping position. Further, this small angle should be equal to the angles which the converging openings 22 and 23 make with the center lines of the side members 14 and 15; thus the angle between the converging openings 22 and 23 should be equal to twice this small angle. It is extremely important that these angles be disposed as mentioned above in order to prevent one of the clamping jaws from overriding the other cooperating therewith and thus producing shearing action which is very injurious to the insulating cable covering. The cotter keys 26 are also instrumental in preventing one of the clamping jaws from overriding the other and producing the objectional shearing action above referred to.

I have found that very satisfactory results may be obtained by making the angles between the planes of the lugs and the planes of the top and bottom members formed integrally therewith approximately 6° and by making the angles between the converging openings 22 and 23 in the side members approximately 12°. A cable clamp constructed in accordance with this specification with the above stipulated angles exhibits a clamping force of the order of 10:1 with respect to the tension in the cable secured.

Although the angle between the converging openings 22 and 23 in the side members 14 and 15 is relatively small the side members are formed of such a length that there will be an appreciable difference in the distance between these openings at the right hand end of the side members and at the left hand end of the side members. Thus it will be apparent that the clamp will produce the desired clamping action where its clamping jaws occupy any position from the extreme right hand end of the side members to the extreme left hand end of the side members and that accordingly, any given size of clamp constructed in accordance with my invention will accommodate a relatively wide range of cable diameters.

In clamping a cable with a cable clamp constructed in accordance with my invention it is merely necessary to assemble the component parts of the clamp about the cable at the desired point along its length. Likewise the clamp is removed by dissassembling the same at this point. Thus it is obvious that my clamp being of the knock-down type may be readily placed upon or removed from a cable of any length without necessitating threading or unthreading the end of the cable through the clamp.

The clamp may be readily assembled as follows: A cable clamping jaw 24 is secured to the top member 12 by placing the stud 28 on the jaw through the opening 27 in the top member and passing a cotter key 29 through the hole in the stud 28. A clamping jaw is similarly secured to the bottom member 13. A side member 15 is placed alongside the cable 11 to be clamped at the desired point and the lugs 25 on top and bottom members 12 and 13 are passed through the openings 22 and 23 respectively in the side member, thus partially enclosing the cable. A cotter key 26 is then dropped through the holes provided in the lugs 25 on the top and bottom members to firmly lock these members to the side member 15. One of the hooked ends 17 of the bail 16 is then passed through the opening 18 in the side member 15 and the other hooked end 17 of bail 16 is passed through the opening 18 in the side member 14. The side member 14 is then swung into place and locked into position similar to that occupied by the side member 15, thus entirely surrounding the cable. The U-shaped end of the bail 16 is then made fast to a suitable supporting structure and the slack in the cable is taken up by pulling it through the clamp from left to right of Fig. 1. The cable will then be firmly held under tension assuming that the left hand end of the same is securely fixed, due to the fact that the tension in the cable causes the clamping jaws to slide toward the left and into clamping position due to the cooperation between the converging openings 22 and 23 in the side members 14 and 15 and the lugs 25 carried by the top and bottom members 12 and 13. Also it will be obvious that upon increased cable tension the grip exerted by the clamp upon the cable will be increased due to the fact that the clamping jaws together with the top and bottom members to which they are secured will slide slightly further to the left with respect to the side members due to the friction exerted by the clamping jaws upon the cable secured; this motion to the left causes the clamping jaws to be more firmly brought together. Accordingly, a fully self-tightening cable clamp is provided and slack lead-in cables may be safely fastened rigidly to an electrical device without danger of short circuits caused by slipping of the lead-in cables in the clamp. Hence when a cable clamp constructed in accordance with my invention is employed, lead-in wires may be securely brazed or soldered to an electrical device fed with energy from the incoming electric cable without the usual electrical hazard of short circuits accompanying such connections.

The component metal parts of my clamp are preferably made integrally by punching and forming processes; however, they may be fabricated from a plurality of separate pieces of metal by riveting, welding, brazing, etc. the pieces together. The clamping jaws employed in my cable clamp are preferably made of an insulating material.

It is apparent from the above description that my cable clamp employs a very few different component parts. For example: the side member 14 is identical with the side member 15; the top member 12 is identical with the bottom member 13; and the upper clamping jaw is identical with the lower clamping jaw. Accordingly a cable clamp constructed in accordance with my invention can be very cheaply produced due to the very few tools required to produce the component parts of the clamp and to the very few operations required by the operator in making these parts.

While I have illustrated and described one embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States, is:

1. A cable clamp including a body comprising top, bottom and side members, an insulating clamping jaw attached to said top member, a cooperating insulating clamping jaw attached to said bottom member, means for forcing said jaws into clamping position comprising lugs on said top and bottom members and cooperating converging openings in said side members, the planes of said lugs being disposed at a relatively small angle with respect to the planes of said top and bottom members respectively and said openings being disposed at an angle to each other of approximately twice said relatively small angle and means for anchoring said body to a supporting structure.

2. A cable clamp including a body comprising top, bottom, and side members, an insulating clamping jaw attached to said top member, a cooperating insulating clamping jaw attached to said bottom member, means for forcing said jaws into clamping position comprising lugs on said top and bottom members extending into cooperating converging openings in said side members, the planes of said lugs being disposed at an angle of approximately 6° with respect to the planes of said top and bottom members respectively and said openings being disposed at an angle of approximately 12° to each other, and means for anchoring said body to a supporting structure.

3. A cable clamp of the knock-down type including a body comprising top, bottom and side members, key means detachably securing said members together, insulating clamping jaws detachably secured to said top and bottom members respectively, said jaws being provided with a notch in either side thereof, means for forcing said jaws into clamping position comprising lugs on said top and bottom members and cooperating cam surfaces on said side members, each of said lugs being provided with an off-set portion which engages one of the notches in said jaws to position the same relative to said top and bottom members, and means for anchoring said body to a supporting structure.

4. A cable gripping clamp including top, bottom and side members detachably secured together, means detachably securing an insulating clamping jaw to said top member, means detachably securing a cooperating insulating clamping jaw to said bottom member, said two mentioned means including openings in said top and bottom members and cooperating studs on said insulating clamping jaws, means for forcing said insulating clamping jaws into clamping position comprising lugs on said top and bottom members and cooperating cam surfaces on said side members, and means for anchoring said clamp to a supporting structure.

5. A cable clamp of the knock-down type including a body comprising top, bottom and side members, key means detachably securing said members together, means detachably securing an insulating clamping jaw to said top member, means detachably securing a cooperating insulating clamping jaw to said bottom member, said last mentioned means comprising a stud on said insulating clamping jaw, a cooperating opening in said member and a key through said stud, means for forcing said jaws into clamping position comprising lugs on said top and bottom members extending into cooperating converging openings in said side members, the planes of said lugs being disposed at the same angle with respect to the planes of said top and bottom members respectively as said converging openings so that said clamping jaws are maintained in substantial parallelism as they are forced into clamping position, and a bail pivotally attached to said side members for attachment to a support.

6. A cable clamp including a body comprising top, bottom and side members, said side members comprising a U-shaped portion provided with diverging legs and a central portion provided with diverging edges lying within said last named portion and joined thereto at the bottom of the U portion and forming therewith converging openings, an insulating clamping jaw attached to said top member, a cooperating insulating clamping jaw attached to said bottom member, said jaws being serrated and contoured to fit a cable, means for forcing said jaws into clamping position including lugs on said top and bottom members which cooperate with said converging openings in said side members, and a bail pivotally attached to said side members for attachment to a support.

7. A cable clamp of the knock-down type formed of a plurality of metal punchings including a body comprising top, bottom, and side members, said side members comprising a U-shaped portion provided with diverging legs and a central portion provided with diverging edges lying within said last named portion and joined thereto at the bottom of the U and forming therewith converging openings, an insulating clamping jaw attached to said top member, a cooperating insulating clamping jaw attached to said bottom member, said jaws being serrated and contoured to fit a cable, means for forcing said jaws into clamping position including lugs on said top and bottom members which cooperate with said converging openings in said side members, the planes of said lugs being disposed at the same angle with respect to the planes of said top and bottom members respectively as said converging openings so that said clamping jaws are maintained in substantial parallelism as they are forced into clamping position, and a bail pivotally attached to said side members for attachment to a support.

8. A cable clamp of the knock-down type formed of a plurality of metal punchings including a body comprising top, bottom, and side members, said side members comprising a U-shaped portion provided with diverging legs and a central portion provided with diverging edges lying within said last-named portion and joined thereto at the bottom of the U and forming therewith converging openings, key means for detachably securing said members together, an insulating clamping jaw detachably secured by means including a key to said top member, a cooperating insulating clamping jaw detachably secured by means including a key to said bottom member, said jaws being serrated and contoured to fit a cable, means for forcing said jaws into clamping position including lugs on said top and bottom members which cooperate with said converging openings in said side members, said lugs being formed integrally with said top and bottom members and serving also to position said insulating clamping jaws with respect to said last mentioned members, and a bail pivotally attached to said side members for attachment to a support.

GERHARD P. SCHWABACHER.